United States Patent [19]

Rühle et al.

[11] Patent Number: 4,748,358
[45] Date of Patent: May 31, 1988

[54] ELECTRIC STARTER MOTOR WITH HOLDER FOR PERMANENT MAGNETS

[75] Inventors: Walter Rühle, Korntal; Peter Kleindieck, Grossbottwar; Kurt Zimmermann, Bietigheim; Manfred Kropp, Diekholzen, all of Fed. Rep. of Germany

[73] Assignee: Robert Bosch GmbH, Stuttgart, Fed. Rep. of Germany

[21] Appl. No.: 86,698

[22] PCT Filed: Sep. 23, 1986

[86] PCT No.: PCT/DE86/00386

§ 371 Date: Jul. 1, 1987

§ 102(e) Date: Jul. 1, 1987

[87] PCT Pub. No.: WO87/03148

PCT Pub. Date: May 21, 1987

[30] Foreign Application Priority Data

Nov. 9, 1985 [DE] Fed. Rep. of Germany ....... 3539851

[51] Int. Cl.[4] .......................................... H02K 21/26
[52] U.S. Cl. .................................... 310/154; 310/254
[58] Field of Search ............... 310/154, 49 MM, 254, 310/258, 259

[56] References Cited

U.S. PATENT DOCUMENTS

| | | | |
|---|---|---|---|
| 3,091,713 | 5/1963 | Latta | 310/154 |
| 3,631,277 | 12/1971 | Ferdig et al. | 310/154 |
| 3,772,546 | 11/1973 | Means | 310/154 |
| 3,790,830 | 2/1974 | Bonfiglio | 310/154 X |
| 3,988,623 | 10/1976 | Yamaguchi et al. | 310/154 |
| 4,225,799 | 9/1980 | Bishai | 310/154 |
| 4,412,145 | 10/1983 | Voss et al. | 310/154 |
| 4,445,060 | 4/1984 | Ruhle et al. | 310/154 |
| 4,580,072 | 4/1986 | Morishita | 310/154 |
| 4,587,449 | 5/1986 | West | 310/154 |

Primary Examiner—Mark O. Budd
Attorney, Agent, or Firm—Michael J. Striker

[57] ABSTRACT

An electric machine, particularly for starting devices, is suggested. Permanent magnets (4 to 9) with assigned flux conducting pieces (10 to 15) are arranged in the housing (1) of the electric machine. The permanent magnets (4 to 9), together with the flux conducting pieces (10 to 15), are preassembled in two rings (18, 19) as retaining parts to form a constructional unit. Each ring (18, 19) has a cylindrical portion (20; 30) which contacts the end portions of the inner side (21; 22) of the permanent magnets (4 to 9) or the flux conducting pieces (10 to 15). A flangelike edge (25; 33) of the rings (18; 19) contacts the front sides (23, 24; 31, 32) of the permanent magnets (4 to 9) and the flux conducting pieces (10 to 15). Tabs (26, 27; 34, 35), which contact the end portions of the free longitudinal sides (17; 28) of the permanent magnets (4 to 9) or the flux conducting pieces (10 to 15), are bent out from the edges 25 and 33. A ring (19) is provided with fastening means (36 to 41) for the detachable fastening of the magnet group (4 to 15, 18, 19) at projections (3) of the housing (1).

5 Claims, 2 Drawing Sheets

ELECTRIC STARTER MOTOR WITH HOLDER FOR PERMANENT MAGNETS

PRIOR ART

The invention is based on an electric machine, particularly for starting devices of internal combustion engines, which includes a cylindrical housing and, within the housing a plurality of arcuate permanent magnets each having a convex side in contact with the inner wall of the housing, an opposite concave side, two opposite longitudinal sides and front sides, and a plurality of magnetic flux conducting pieces arranged, respectively, in contact with a longitudinal side of assigned permanent magnets. An electric machine in which the permanent magnets are held in a housing by means of retaining springs is already known. The retaining springs are arranged between two adjacent permanent magnets in each instance and have resilliently contacting spring arms as well as fastening means at one front face of the permanent magnets in order to hold the permanent magnets in the correct position in the housing. By means of the deliberately produced dome effect, no additional fastening of the permanent magnets in the housing are required in this known arrangement. If in a known electric machine the permanent magnets are provided with magnetic flux conducting pieces, then radial forces act on the flux conducting pieces in the direction toward the armature, which radial forces are so great that the retaining springs must be additionally fastened in the housing with at least one rivet in order to hold the permanent magnets and flux conducting pieces in fixed position in the housing. Such a fastening of the permanent magnets with the assigned flux conducting pieces has the disadvantage that it requires numerous fastening parts in the form of retaining springs and rivets and, when taken with high assembly costs, is no longer economical.

SUMMARY OF THE INVENTION

The object of the invention is to provide an electric machine of the type named in the beginning in which the permanent magnets, together with the flux conducting pieces, can be securely, but detachably, arranged and fastened in the housing at low cost with simple means.

In keeping with this object and others which will become apparent hereafter, one feature of this invention resides in the provision of resilient retaining means for fastening the permanent magnets and conducting pieces in fixed, circumferential and longitudinal positions in the housing, the retaining means consisting of two facing rings each having a flangelike edge part matching the inner diameter of the housing and engaging assigned front sides of the permanent magnets and conducting pieces, a cylindrical part projecting at right angles from the edge part to contact assigned end portions of the concave sides of the permanent magnets and the conducting pieces, the edge parts being provided with retaining projections for engaging end portions of free longitudinal sides of respective permanent magnets and conducting pieces and the edge part of at least one of the rings being provided with axially directed projections for detacheably fastening the one ring to the inner wall of the housing. Preferably, at least one catch projection is formed on the inner wall of the housing, and at least one axially directed projection of the one ring can snap engage at the catch projection. At the other ring, there is provided at least one resilient projection, which is bent outwardly over the edge part of the other ring to engage an intermediate bearing or drive bearing arranged at an end side of the housing.

It is advantageous that only two retaining rings, which can be used regardless of the respective magnet length and clockwise or counterclockwise rotation of the electric machine, are required in order to securely hold the permanent magnets with the assigned flux conducting pieces. Moreover, the retaining rings make it possible to fix the permanent magnets and flux conducting pieces in a form-locking manner and to preassemble the magnet group. Moreover, the retaining rings form a mechanical protection for the magnets when.

Advantageous developments of the electric machine indicated in the main claim are made possible by means of It is particularly advantageous that retaining projections, fastening projections and means which compensate for tolerances are formed on one retaining ring, by means of which retaining parts a ring can catch at projections of the housing so as to be detachable, while the other ring comprises resilient projections for compensating the relatively considerable manufacturing tolerances in the longitudinal direction. In addition, the annular retaining parts can be formed, according to the type and load of the electric machine, from spring steel, a viscoplastic, heat-resistant plastic or light metal.

DRAWING

An embodiment example of the invention is shown in the drawing and is explained in more detail in the following description.

DESCRIPTION OF THE PREFERRED EMBODIMENT

Figure 1:
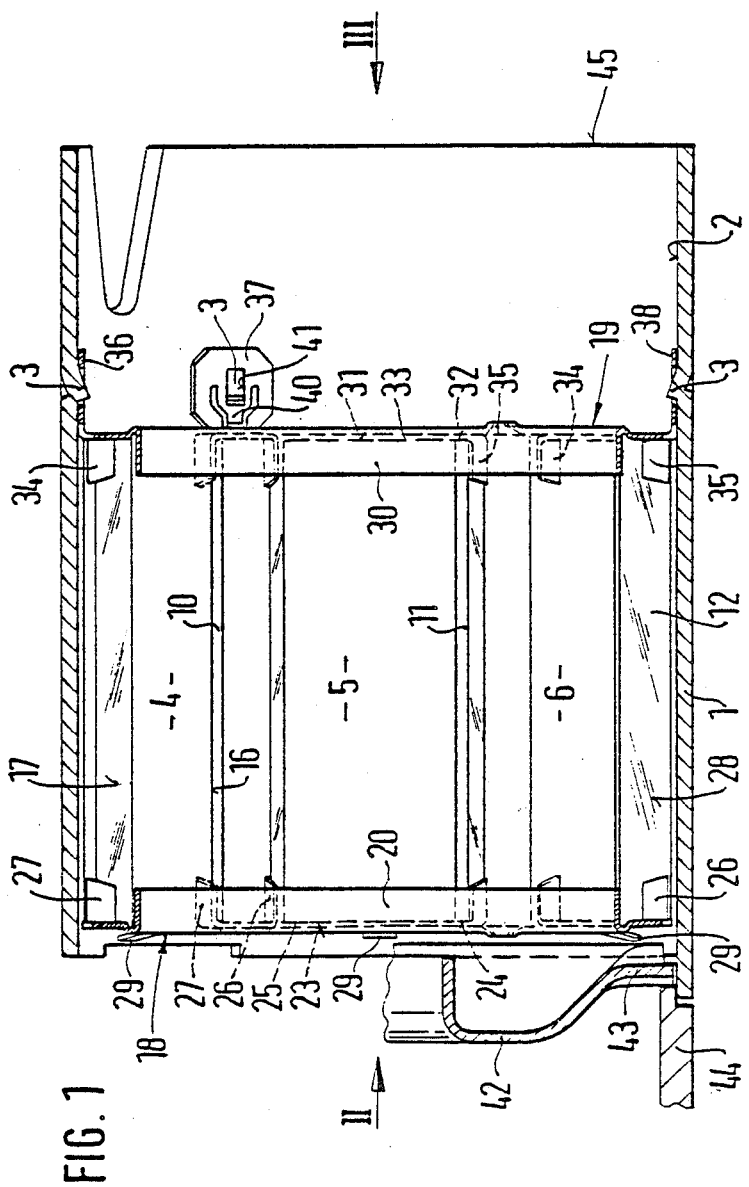
FIG. 1 shows the housing of an electric machine in longitudinal section.
Figure 2:
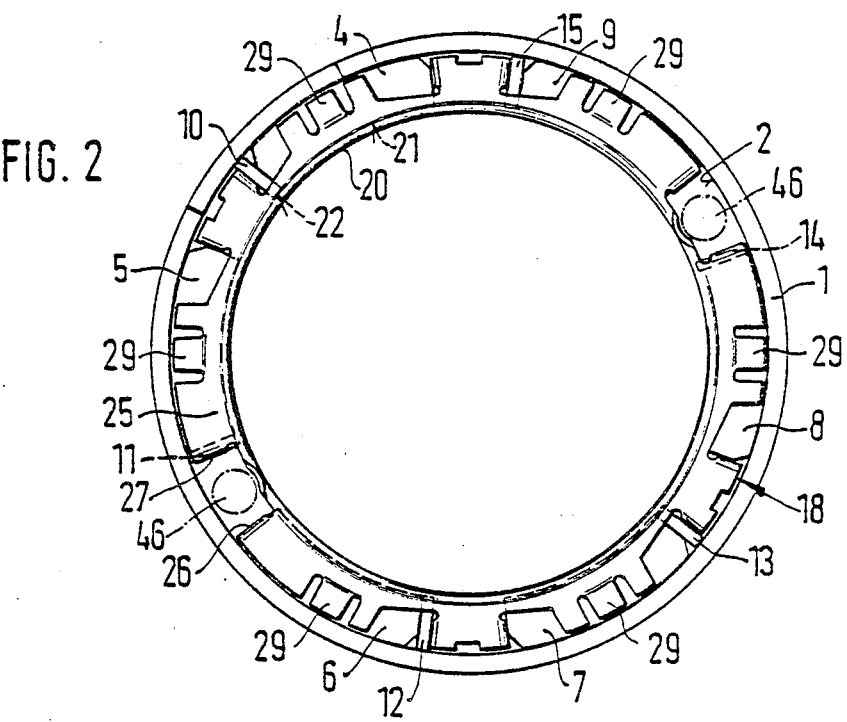
FIG. 2 shows a front view in the direction of arrow II.
Figure 3:
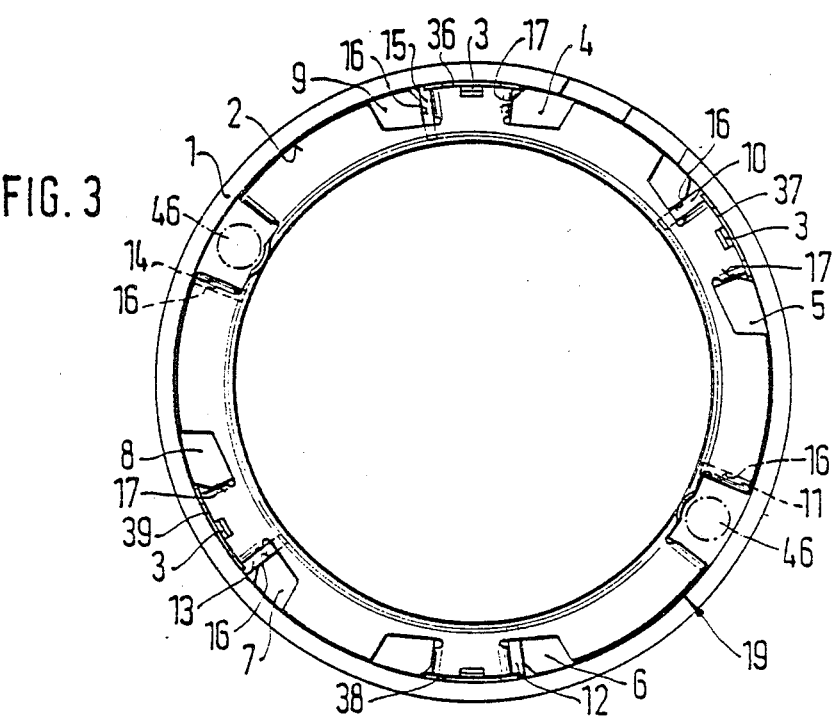
FIG. 3 shows a front view in the direction of arrow III in FIG. 1.

Radially projecting catch projections 3 are constructed by means of stamping, for example, at the inner wall 2 of a cylindrical housing 1 of an electric machine so as to be perpendicular to the longitudinal axis of the housing 1. A magnet group is detachably inserted in the housing 1. The magnet group is formed from three permanent magnet pairs, wherein a magnetic flux conducting piece 10 to 15 is assigned to each permanent magnet 4 to 9. The permanent magnets 4 to 9 are curved in such a way that their outer convex side is adapted to the inner wall 2 of the housing 1. According to the direction of rotation of the armature of the electric machine, which armature is known per se and is not shown in more detail, each flux conducting piece 10 to 15 contacts one or the other longitudinal side 16 or 17 of the assigned permanent magnet 4 to 9.

The permanent magnets 4 to 9, together with the flux conducting pieces 10 to 15, are preassembled as magnet groups by means of resilient retaining means. The retaining means consist of two rings 18 and 19 made, for example, of spring steel. According to the type and load, the rings can also be formed as formed parts made of viscoplastic synthetic material or light metal, such as aluminum.

The ring 18 has an axially directed cylindrical portion 20 on which an end end portions of the concave sides 21 or 22 of the permanent magnets 4 to 9, or the flux conducting pieces 10 to 15, rest, the edge portion adjoining a front side 23 and 24 of the permanent magnet 4 to 9 or the flux conducting piece 10 to 15.

The ring 18 has a flangelike edge part 25 which extends perpendicularly relative to the cylindrical portion 20 to engage the front side 23 or 24 of the permanent magnets 5 to 9 and the flux conducting pieces 10 to 15. The diameter of the edge part 25, matches the inner diameter of the housing. Tabs 26 and 27 are punched out of the edge part 25 and are bent to engage the free longitudinal side 17 of respective permanent magnets 4 to 9 and a free longitudinal side 28 of the flux conducting pieces 10 to 15 adjoining the assigned permanent magnets 4 to 9. The permanent magnets 4 to 9, together with the flux conducting pieces 10 to 15, are fixed in their positions relative to one another in the longitudinal and circumferential direction by means of the edge part 25 and the tabs 26 and 27. Moreover, the flux conducting pieces 10 to 15 are held at the respective assigned permanent magnets 4 to 9 in a form-locking manner by means of the tabs 26, 27.

In addition, six spring arms 29 are bent out of the edge part 29, to project outwardly away from the front sides 23 and 24. Their manner of operation is explained further on.

The ring 19 likewise has a cylindrical portion 30. The latter supports an end portion of the concave side 21 and 22 of the permanent magnets 4 to 9 and the flux conducting pieces 10 to 15.

The ring 19 likewise has a flangelike edge part 33. Tabs 34 and 35 are also punched out of the edge part 33 and bent at the longitudinal side 17 of the permanent magnets 4 to 9 and at the longitudinal side 28 of the flux conducting pieces 10 to 15. Accordingly, the permanent magnets 4 to 9, with the adjoining flux conducting pieces 10 to 15, are aligned relative to one another and held in their longitudinal, circumferential and radial directions as a magnet group and preassembled as a constructional unit by means of the rings 18 and 19. Moreover, the rings 18, 19 form a mechanical protection when inserting the magnet group in the housing 1, particularly for the front side areas of the magnet group 4 to 15.

Four fastening tabs 36 to 39 are punched out at the edge part 33 of the ring 19 in addition and are bent away at right angles relative to the edge part 33, but in the opposite direction of the tabs 34, 35. A spring tongue 40 comprising a slot 41 is constructed in each fastening tab 36 to 39.

The preassembled magnet group 4 to 15, 18, 19 is pushed into the housing 1 until the fastening tabs 36 to 39 catch with their slotted spring tongues 40 at the catch projections 3 which project radially at the inner wall 2 of the housing 1. The magnet group 4 to 15, 18, 19 is accordingly fastened in the housing 1 so as to be fixed in its position and so as to be detachable. The housing 1 is covered opposite the front sides 23 and 24 magnets and conducting pieces and opposite the edge part 25 of the ring 18 by an intermediate bearing 42 at which the spring arms 29 of the ring 18 are supported. The intermediate bearing 42 serves, in a manner known per se and not shown in more detail, as a bearing for the armature shaft of the electric machine, the armature shaft also being known per se and not shown in more detail. The intermediate bearing 42 is provided with spring tongues 43 at the circumference, which spring tongues 43 are arranged and fastened between the front sides of the housing 1 and a drive bearing 44 in a manner known per se. In general, the drive bearing 44 and a commutator bearing, not shown, which is arranged at the front side 45 of the housing 1, are fastened at the housing 1 by means of tie rods 46. Through-openings are provided for the tie rods 46 projecting through the magnet group 4 to 15, 18, 19 by means of correspondingly bending away the tab pairs 26, 27 in the edge 25 of the ring 18, as well as tab pairs 34, 35 in the edge 33 of the ring 19. The tab pairs 26, 27; 34, 35 serve, in turn, as mechanical protection for the permanent magnets 4 to 9, together with conducting pieces 10 to 15, when inserting the tie rods 46.

In known constructions with intermediate bearings the drive bearing is arranged directly at the housing 1 and the spring arms 29 are then supported at the drive bearing.

We claim:

1. In an electric machine, of the type having a cylindrical housing and within the housing, a plurality of arcuate permanent magnets each having a convex side contact with the inner wall of the housing, an opposite concave side, two opposite longitudinal sides and front sides, and a plurality of magnetic flux conducting pieces arranged, respectively, in contact with a longitudinal side of assigned permanent magnets, the improvement comprising resilient retaining means for fastening said permanent magnets and conducting pieces in fixed circumferential and longitudinal positions in the housing, said retaining means consisting of two facing rings each having a flangelike edge part matching the inner diameter of said housing and engaging assigned front sides of said permanent magnets and conducting pieces, a cylindrical part projecting at right angles from said edge part to contact assigned end portions of the concave sides of the permanent magnets and the conducting pieces, said edge parts including retaining projections for engaging end portions of free longitudinal sides of respective permanent magnets and conducting pieces and the edge part of at least one of said rings being provided with axially directed projections for detacheably fastening said one ring to the inner wall of the housing.

2. The retaining means according to claim 1, wherein at least one catch projection is formed on the inner wall of the housing to engage at least one of said axially directed projection of said one ring, and the other ring having at least one resilient projection, which is bent outwardly over the edge part of the other ring to engage an intermediate bearing or drive bearing arranged at an end side of the housing.

3. The retaining means according to claim 1, wherein the rings consist of spring steel.

4. The retaining means according to claim 1, wherein the rings are constructed as formed parts of viscoplastic material.

5. The retaining means according to claim 1, wherein the rings are constructed as injection molded parts of light metal.

* * * * *